R. E. FROELICH.
REGULATING DEVICE FOR TIMING CAMERA SHUTTERS RELATIVE TO FLASH LIGHTS.
APPLICATION FILED JAN. 25, 1917.
1,332,173.
Patented Feb. 24, 1920.
2 SHEETS—SHEET 1.
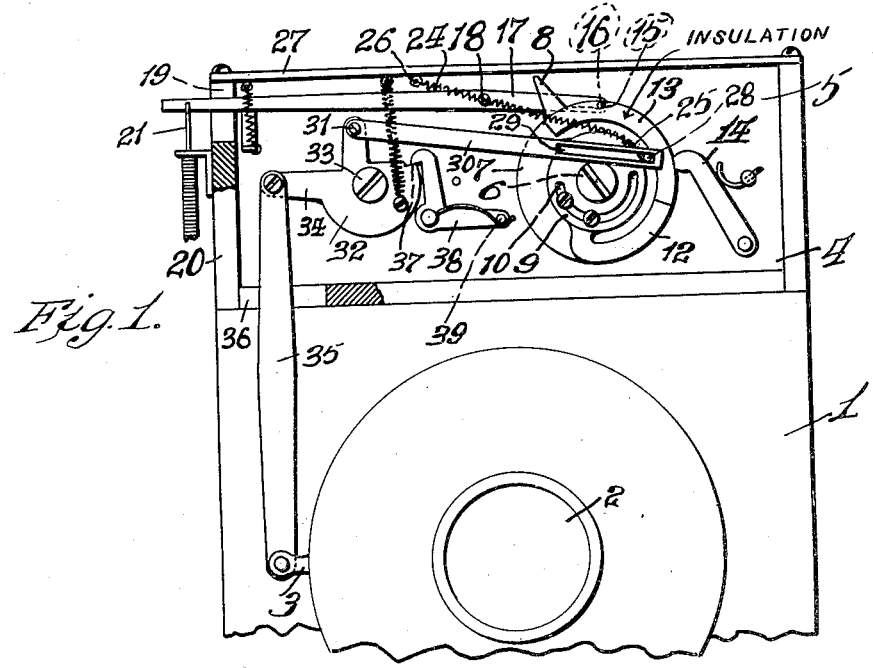
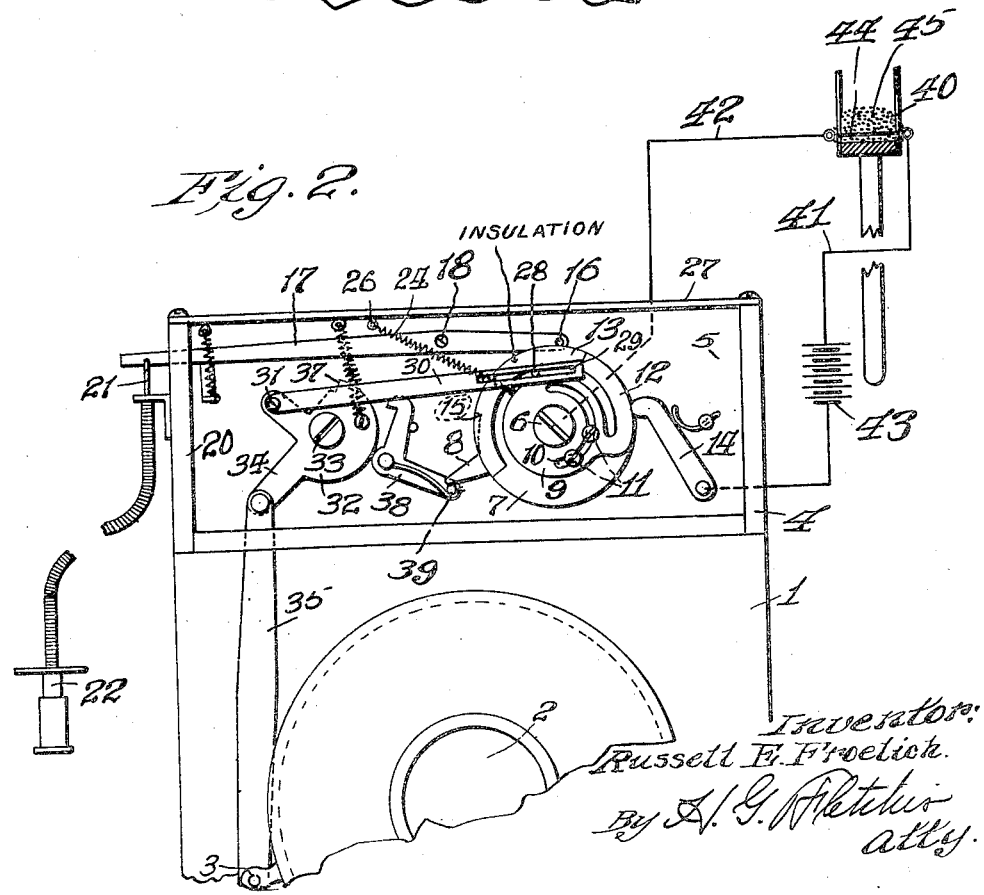

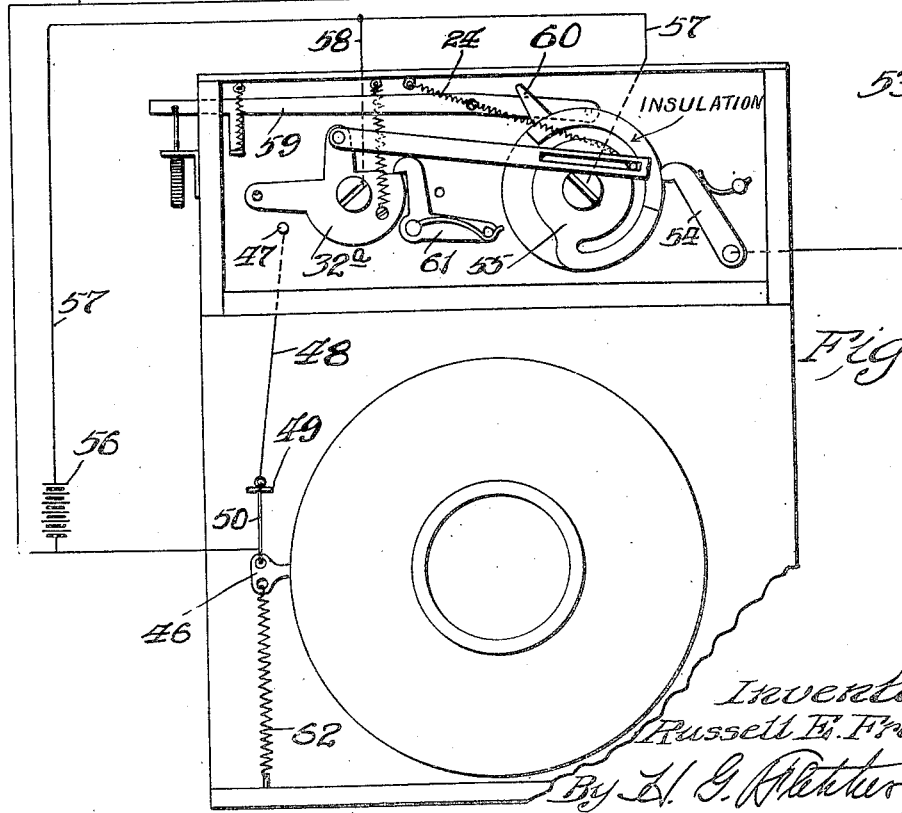

UNITED STATES PATENT OFFICE.

RUSSELL E. FROELICH, OF ST. LOUIS, MISSOURI, ASSIGNOR OF ONE-SIXTH TO MARION F. PARKER, OF WEBSTER, MISSOURI.

REGULATING DEVICE FOR TIMING CAMERA-SHUTTERS RELATIVE TO FLASH-LIGHTS.

1,332,173.   Specification of Letters Patent.   Patented Feb. 24, 1920.

Application filed January 25, 1917. Serial No. 144,422.

*To all whom it may concern:*

Be it known that I, RUSSELL E. FROELICH, a citizen of the United States of America, and a resident of the city of St. Louis and State of Missouri, have invented certain new and useful Improvements in Regulating Devices for Timing Camera-Shutters Relative to Flash-Lights, of which the following is a specification.

The primary object of this invention is to provide an improved regulating or timing mechanism that is operably related to the shutter of a camera so that the shutter can be actuated at the proper and exact time relative to the explosive flash of a flash lamp, so that an efficient exposure is given to the plate or film at the time that the explosive flash of the lamp is at its greatest efficiency.

Another object of this invention is to provide an improved timing mechanism relative to cameras that are operated in conjunction with flash lamps, so that the length of time required to actuate the camera shutter can be regulated relative to the length of time required to explode or burn a given quantity of flash powder.

Other and further objects will appear in the specification and be specifically pointed out in the appended claims, reference being had to the accompanying drawings exemplifying the invention, and in which, Figure 1 is a front elevation, partly in section showing this improved regulating device mounted on a camera, the parts being shown in a set position ready for operation.

Fig. 2 is a view similar to Fig. 1, showing the parts in discharged or operated positions.

Fig. 3 is an elevation of the setting and contacting member, said setting member being positioned at its greatest distance away from the contacting member.

Fig. 4 is a similar view to Fig. 3, but showing the setting member in an advanced position relative to its position shown in Fig. 3.

Fig. 5 is a vertical section taken on the line V—V of Fig. 3.

Fig. 6 is a view similar to Figs. 1 and 2, but showing a modified form of operation relative to the camera shutter.

Referring to the drawings, 1 designates a camera, 2 the lens and 3 the shutter operating lever. This improved regulating device comprises a housing 4 which is mounted on top of the camera in any suitable manner, and secured to the rear wall 5 of said housing is an axis 6, and turnably mounted on said axis is a disk 7. Extending from the periphery of said disk is a striking arm 8. Turnably mounted on the axis 6 is a setting member 9, said setting member having a slot 10 formed therein so that it can be adjustably mounted to the disk 7 by the set screws 11, said setting member having a contacting portion 12.

Secured to and abutting one end of the contacting portion 12 is an insulated segment 13, the peripheral surface of said contacting portion 12 and insulated segment 13 being flush with each other, so that the spring actuated contacting finger 14 will have a smooth contacting engagement with said surface. Formed on the peripheral edge of the disk 7 adjacent the arm 8 is a pin engaging notch 15, and adapted to engage said notch is a pin 16, said pin being carried at one end of a spring actuated lever 17, said lever being pivoted at 18 to the rear wall 5 of the housing 4, the opposite end of said lever extending through an opening 19 which is formed on the side wall 20 of said housing.

Connected to the extending end of said lever is a pull wire 21 of a releasing member 22. Formed on the peripheral edge of the setting member 9 is a spring seating groove 23, said groove being for the reception of one end of the spring 24, said spring being secured at 25 to said member 9, the opposite end of said spring being secured at 26 to the top wall 27 of the housing 4.

Carried by the disk 7 is a resetting pin 28, said pin being engaged in a slot 29 which is formed in one end of a pull rod 30, the opposite end of said rod being pivotally secured at 31 to a spring actuated member 32, said member being swingingly mounted on an axis 33 which is carried by the rear wall 5. Extending from said member 32 is an arm 34, and secured to said arm and to the shutter operating lever 3 is a connecting rod 35, said rod extending through an opening 36 which is formed in the bottom of the housing 4.

Formed on the spring actuated member 32 is a trigger engaging portion 37, said portion 37 adapted to be engaged by an L- shaped trigger 38. Carried by said trigger is a pin 39, said pin being in the path of travel of the striking arm 8.

In leading up to the operation of this improved timing or regulating device, it is well to dwell on the great necessity of a device of this character inasmuch as the same relates to night photography or to the taking of pictures in dark places, in which it is necessary to explode or burn a predetermined quantity of flash powder in the flash lamp, the amount of powder to be used being governed by the surrounding circumstances. It is well known that it will take a longer time to burn a large quantity of powder than it will to burn a small quantity, and furthermore it is known by those skilled in the art of photography relative to flash light exposures that there is an intermediate period during the burning of the flash powder, in which a maximum amount of light is given. In this connection in order to obtain a proper exposure, it is essential that the shutter be operated at just such a time when the maximum amount of light is given from the burning flash powder.

In some cameras the shutters thereof have a mechanism of such a construction in which a greater amount of time is required to operate the shutters. This improved device is therefore adapted to take care of all the afore related conditions, so that the proper amount of time to be allowed for the operation of a flash lamp and its relatable camera shutter can be predetermined, and the parts relating thereto so set so as to operate the flash lamp and shutter at the required time.

As shown in Fig. 1, the operating parts are all set in positions ready to be released relative to making an exposure. In releasing the aforesaid parts, the releasing member 22 is engaged and manipulated, thereby exerting a pull on the wire 21 and actuating the lever 17, thereby releasing the pin 16 carried thereby from the notch 15 which is formed in the disk 7. This will release the disk 7, and inasmuch as the setting member 9 is clamped to said disk by the set screws 11, and the spring 24 is secured thereto, said spring will cause said disk to turn to the left, and in the travel of said disk the striking arm 8 carried thereby will engage the trigger pin 39, thereby releasing the trigger 38 from engagement with the member 32, and inasmuch as said member 32 is spring actuated, the arm 34 thereof will be moved downwardly, thereby causing the connecting rod 35 to actuate the shutter operating lever 3. Prior to the actuation of the shutter lever 3, however, it is to be noted that the contacting portion 12 of the setting member 9 first engaged the contacting finger 14, and inasmuch as said contacting finger is in circuit with the flash lamp 40 through the wires 41 and 42 and battery 43, said electrical circuit was closed and the fuse wire 44 was fused, thereby igniting the quantity of flash powder 45 before the striking arm 8 had released the trigger 38, thereby giving time for the flash powder to burn to such a stage whereby the maximum amount of light would be given off, at which time the trigger 38 will have been released by the striking arm 8 and the shutter lever 3 operated. In returning the parts to their neutral positions the resetting pin 28 which is carried by the disk 7 is engaged and moved to the right, and inasmuch as said pin 28 is engaged in the slot 29 of the pull rod 30, said pin will exert a pull on said rod and cause it to return the member 32, thereby pulling the connecting rod 35 and resetting the shutter lever 3, and the pin 16 of the lever 17 will fall into the notch 15 of the disk 7, thereby holding said disk in its set position.

Referring to Figs. 3 and 4 of the drawings, it is to be noted that the contacting portion 12 of the setting member 9 has been moved to such a position so that it is a considerable distance away from the contacting member 14, whereas in Fig. 4 the contacting portion 12 has been set over to a position in close proximity to the contacting member 14. These positions of said contacting members it is to be noted are set to denote the extremities of distances of adjustment, relative to the contacting finger 14 and to the striking arm 8, as the nicety of adjustment of the setting member 9 has to be adjusted on predetermined lines relative to the time of total maximum efficiency of the flash of the flash light powder and the operating of the camera shutter. In this connection it is to be noted that the striking arm 8 always has the same distance to travel before it strikes the trigger pin 39, whereas the contacting portion 12 is adjusted relative to its distance of travel before it engages the contact finger 14. In the instance of the disclosure shown in Fig. 3, the contacting portion 12 will engage the contact finger 14 but a short period of time ahead of the striking arm 8 engaging the trigger pin 39, thereby closing the electrical circuit, and causing the flash powder in the flash pan to burn just prior to the operation of the shutter lever 3.

If it is desired to provide a much greater length of time between the igniting of the flash powder in the flash lamp and the operating of the shutter lever, then the contacting portion 12 of the setting member 9 is moved and set in a position toward and adjacent the contact finger 14 as shown in Fig. 4.

It therefore necessarily follows if any intermediate adjustment is desired relative to the contacting portion 12 and contact finger 14, any desired adjustment can be made by locating the contact portion 12 in any intermediate position between the extreme positions shown in Figs. 3 and 4.

The embodiment shown in Fig. 6 discloses how the camera shutter lever 46 can be electrically operated as well as the flash pan, in which the connecting rod 35 is done away with and the member 32ᵃ is adapted to contact with an electrical terminal 47, and leading from said terminal is a wire 48, said wire being connected to a bracket 49. Connecting said bracket and the shutter lever 46 is a fuse wire 50. Leading from said fuse wire to the lamp 51 is a wire 52, said wire being connected to the lamp fuse wire 52ᵃ, and leading from the opposite end of the fuse wire 52ᵃ is a wire 53, said wire leading to the contact member 54, said contact member 54 being operably related to the time setting member 55, and leading from said time setting member to a battery 56 is a wire 57. Connecting the wire 57 and the member 32ᵃ is a wire 58.

From the aforesaid relating to Fig. 6 when all of the parts are set in the positions shown, when the lever 59 is actuated and the setting member 55 is allowed to contact with contact member 54, the powder in the pan 51 will be ignited and the striking arm 60 will in turn release the trigger 61 from engagement with the member 32ᵃ, thereby allowing said member 32ᵃ to contact with the electrical terminal 47, in which instance electrical communication will be established, and the fuse wire 50 fused and broken, thereby allowing the spring 62 to actuate the shutter lever 46. In this form of construction in which the shutter lever 46 is allowed to operate by the burning of the fuse wire 50, the mechanisms 32ᵃ and 55 and parts relating thereto, need not be mounted on a camera, but can be carried in the pocket or placed anywhere where it is desired, as the system of electrical wiring relative to the flash lamp and shutter lever will allow for the parts to be separated.

What I claim is:

1. A regulating device for a camera comprising a revolubly mounted member, an adjustably mounted setting member having an insulated segmental portion, and a contacting portion carried by said revoluble member, an electrical contacting finger for engagement with said insulated portion, and said contacting portion of said setting member, a flash lamp in electrical communication with said contacting portion of said setting member and said contacting finger, and a shutter releasing mechanism coöperable with said revoluble member and the shutter lever of a camera shutter.

2. In a camera regulating device, a revoluble member, an adjustably mounted setting member having an insulated portion carried by said revoluble member, an electrical contacting finger for engagement with said setting member, a flash lamp in circuit with said setting member and said finger, and releasing means for allowing said revoluble member to rotate.

3. In a camera regulating device, a revoluble member, an adjustably mounted setting member having an insulated portion carried by said revoluble member, an electrical contacting finger for engagement with said setting member, a shutter releasing mechanism coöperable with said revoluble member, a flash lamp in circuit with said setting member and said finger, and releasing means for allowing said revoluble member to rotate.

4. A device for predetermining the time of actuation of a camera shutter relative to the explosion of a flash light comprising a movable member, bearing adjustable insulated and non-insulated surfaces, a contacting member for engagement with both of said surfaces, a camera shutter lever, means for holding said movable member against movement, and a flash lamp having electrical communication with said movable member and said contacting member.

5. A device for predetermining the time of actuation of a camera shutter relative to the explosion of a flash light comprising a movable member, bearing adjustable insulated and non-insulated surfaces, a contacting member for engagement with both of said surfaces, a camera shutter lever, a releasing mechanism coöperable with said movable member and said shutter lever, means for holding said movable member against movement, and a flash lamp having electrical communication with said movable member and said contacting member.

6. A regulating device for a camera comprising a shutter operating mechanism, a flash lamp, a flash lamp operating mechanism coöperably related to said shutter operating mechanism comprising a turnably mounted member bearing a striking arm, an electrical contacting member carried by said member and adjustably mounted thereto, said contacting member providing means for causing said lamp operating mechanism to operate said lamp before the actuation of said shutter operating mechanism, said contacting member when so adjusted also providing means whereby said lamp operating mechanism can operate on said shutter mechanism before said lamp is actuated upon.

7. A regulating device for a camera comprising a revoluble member, an adjustably mounted insulated setting member carried by said revoluble member, an electrical contacting finger for engagement with said setting member, a flash lamp in electrical communication with said setting member and said contact finger, and a shutter releasing mechanism coöperably related to said revoluble member.

8. A regulating device for a camera, comprising a revolubly mounted member bearing a striking arm, an adjustably mounted setting member having an insulated segmental portion, and a contacting portion carried by said revoluble member, an electrical contacting finger for engagement with said insulated portion and said contacting portion of said setting member, a flash lamp in electrical communication with said contacting portion of said setting member and said contacting finger, a shutter releasing mechanism, and a releasing trigger related to said striking arm of said revoluble member and said shutter releasing mechanism.

9. A regulating device for a camera comprising a revoluble member, an adjustably mounted insulated setting member carried by said revoluble member, an electrical contacting finger for engagement with said setting member, a flash lamp in electrical communication with said setting member and said contact finger, a shutter releasing mechanism coöperably related to said revoluble member, and a resetting member related to said revoluble member and said shutter releasing mechanism for resetting said shutter releasing mechanism.

10. A device for predetermining the time of actuation of a camera shutter relative to the explosion of a flash light comprising a movable member bearing adjustable insulated and non-insulated surfaces, a contacting member for engagement with both of said surfaces, a camera shutter lever, a releasing mechanism coöperable with said movable member and said shutter lever, means for holding said movable member against movement, other means for releasing said holding means, and a flash lamp having electrical communication with said movable member and said contacting member.

11. A device for predetermining the time of actuation of a camera shutter relative to the explosion of a flash light comprising a movable member bearing adjustable insulated and non-insulated surfaces, a contacting member for engagement with both of said surfaces, a camera shutter lever, a releasing mechanism coöperable with said movable member and said shutter lever, means for holding said movable member against movement, other means for releasing said holding means, resetting means coöperable with said movable member and said releasing mechanism, and a flash lamp having electrical communication with said movable member and said contacting member.

12. A device for predetermining the time of actuation of a camera shutter relative to the explosion of a flash light comprising a movable member bearing an adjustable setting member, a camera shutter lever, a releasing mechanism coöperable with said movable member and said shutter lever, resetting means for said movable member and said releasing mechanism, and a flash light emitting element related to said movable member.

RUSSELL E. FROELICH.